US010848969B2

(12) United States Patent
Chen et al.

(10) Patent No.: US 10,848,969 B2
(45) Date of Patent: Nov. 24, 2020

(54) AUTHENTICATION BASED ACCESS TO WIRELESS DEVICES

(71) Applicant: HEWLETT-PACKARD DEVELOPMENT COMPANY, L.P., Houston, TX (US)

(72) Inventors: Chung-Chun Chen, Taipei (CN); Yi-Kang Hsieh, Taipei (CN); Han-Kuang Chang, I, Taipei (CN); Isaac Lagnado, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 143 days.

(21) Appl. No.: 16/075,626

(22) PCT Filed: Jan. 25, 2017

(86) PCT No.: PCT/US2017/014795
§ 371 (c)(1),
(2) Date: Aug. 4, 2018

(87) PCT Pub. No.: WO2018/139994
PCT Pub. Date: Aug. 2, 2018

(65) Prior Publication Data
US 2019/0036903 A1    Jan. 31, 2019

(51) Int. Cl.
*H04L 29/06* (2006.01)
*H04L 29/08* (2006.01)
(Continued)

(52) U.S. Cl.
CPC .......... *H04W 12/06* (2013.01); *H04L 63/083* (2013.01); *H04L 67/34* (2013.01); *H04W 4/80* (2018.02); *H04W 76/11* (2018.02)

(58) Field of Classification Search
CPC ....... H04L 63/083; H04L 67/34; H04L 29/08; H04L 29/06; H04W 4/80; H04W 76/11; H04W 12/06; H04W 12/08
See application file for complete search history.

(56) References Cited

U.S. PATENT DOCUMENTS

| 8,107,879 B2 | 1/2012 | Pering et al. |
| 8,116,679 B2 | 2/2012 | Dunko |

(Continued)

FOREIGN PATENT DOCUMENTS

| CN | 105592399 A | 5/2016 |
| EP | 2355563 A1 | 8/2011 |
| KR | 101604927 B1 | 3/2016 |

OTHER PUBLICATIONS

"Android "L" Feature Spotlight: Write Wi-Fi Passwords To NFC Tags Directly From Android", Retrieved from Internet : http://www.androidpolice.com/2014/06/27/android-l-feature-spotlight-write-wi-fi-passwords-to-nfc-tags-directly-from-android/, 2014, 14 pages.

*Primary Examiner* — Jayesh M Jhaveri
(74) *Attorney, Agent, or Firm* — HPI Patent Department (57) ABSTRACT

In one example, a computing device is disclosed, which includes a storage unit, a communication interface, and an authentication unit. The storage unit may store communication information corresponding to a wireless device. The communication information may include information used to establish communication between the wireless device and a user device. Further, the communication interface may receive a request to establish communication with the wireless device from the user device via a short-range wireless communication. Furthermore, the authentication unit may authenticate an access credential associated with the user device to access the wireless device and enable the storage unit to transmit the communication information associated with the wireless device to the user device upon successful (Continued)

authentication. The communication information is set up on the user device to establish communication with the wireless device.

16 Claims, 6 Drawing Sheets

(51) Int. Cl.
*H04W 12/06* (2009.01)
*H04W 4/80* (2018.01)
*H04W 76/11* (2018.01)

(56) References Cited

U.S. PATENT DOCUMENTS

| | | | |
|---|---|---|---|
| 9,542,784 B2* | 1/2017 | O'Toole | H04W 12/00503 |
| 9,930,514 B2* | 3/2018 | Conn | H04W 8/005 |
| 2010/0195539 A1* | 8/2010 | Tian | H04L 47/828 |
| | | | 370/255 |
| 2013/0229929 A1 | 9/2013 | Linsky | |
| 2015/0128219 A1* | 5/2015 | Guday | H04L 63/08 |
| | | | 726/4 |
| 2015/0327069 A1* | 11/2015 | Fu | H04W 12/06 |
| | | | 726/5 |
| 2016/0057626 A1* | 2/2016 | O'Toole | G06Q 30/0226 |
| | | | 726/4 |
| 2016/0073218 A1* | 3/2016 | Shui | H04W 76/10 |
| | | | 455/41.2 |
| 2016/0094994 A1* | 3/2016 | Kirkby | G11B 27/028 |
| | | | 380/270 |

* cited by examiner

AUTHENTICATION BASED ACCESS TO WIRELESS DEVICES

BACKGROUND

Mobile devices, such as mobile phones, laptops, computers, tablet computers, and other electronic consumer gadgets, may be connected to a set of wireless devices via different wireless technologies. For instance, a user may use his or her mobile device to stream media to a loudspeaker or a television, to make voice calls using a wireless headset, to send documents to a printer, operate Internet of things (IoT)-enabled light bulb/projector/air conditioner, and the like. The communication between the mobile device and the wireless devices may be established through a wireless link, using Bluetooth, Wi-Fi, ZigBee, a cellular radio technology, and/or any other wireless technology.

BRIEF DESCRIPTION OF THE DRAWINGS

Examples are described in the following detailed description and in reference to the drawings, in which.

DETAILED DESCRIPTION

User devices may establish connection with wireless devices via different wireless technologies. Example user device may include mobile phones, laptops, computers, tablet computers, and other electronic consumer gadgets. Example wireless devices may include Wi-Fi-enabled devices, Bluetooth-enabled devices, Bluetooth Low Energy (BTLE)-enabled devices, wireless display devices, wireless docking stations, Internet of things (IoT)-enabled devices, Wireless Gigabit Alliance (WiGig)-enabled devices, ZigBee-enabled devices, Radio Frequency Identification (RFID)-enabled devices, and the like. For establishing the connection, a user may need device information and/or credentials (e.g., passwords) of the wireless devices. Further, the user may need to manually configure/set the device information and/or credentials on a user device.

For example, to establish connection to a Wi-Fi access point (AP) device, a user may have to first enable wireless-network access on the user device, search/select a Wi-Fi AP device with which a connection will be attempted, and then enter the device information and password associated with the Wi-Fi AP device. In another example, to establish connection to a Bluetooth speaker, the user may have to set the user device in a discoverable mode to select a device from a list of discoverable devices found within a communication range, of the user device and then initiate a pairing process with the device that the user want to connect to. The term "connection" may refer to two devices exchanging appropriate information to begin communication. The term "pairing" may refer to the two devices exchanging a protected security identification number or password.

Therefore, the pairing and connection procedures for such different technology devices can be difficult/tedious and time consuming when there are numerous devices with which to pair. As a result, it may not be convenient for the user (e.g., a guest user) to connect the user device to the wireless devices or to switch from one wireless device connected to the user device to another wireless device.

Examples described herein may provide a computing device including a storage unit, a communication interface, and an authentication unit. The storage unit may store communication information corresponding to wireless device. The communication information may include information used to establish communication between the wireless device and a user device. The communication interface may receive a request to establish communication with the wireless device from the user device via a short-range wireless communication.

The authentication unit may authenticate an access credential associated with the user device to access the wireless device. Further, the authentication unit may enable the storage unit to transmit the communication information associated with the wireless device to the user device upon successful authentication. In one example, the communication information may be automatically configured/set up on the user device to establish communication with the wireless device, for instance, disposed in a location.

Examples described herein may obviate the manual intervention needed for connecting/pairing the user device to wireless devices. Further, the examples described herein may reduce the complexity and time-consumption of the connection/pairing procedures by automatically configuring the pairing, and connection information on the user device. Furthermore, the examples described may provide an improved, reliable, and secure transmission of communication information of the wireless devices to the user device.

Figure 1:
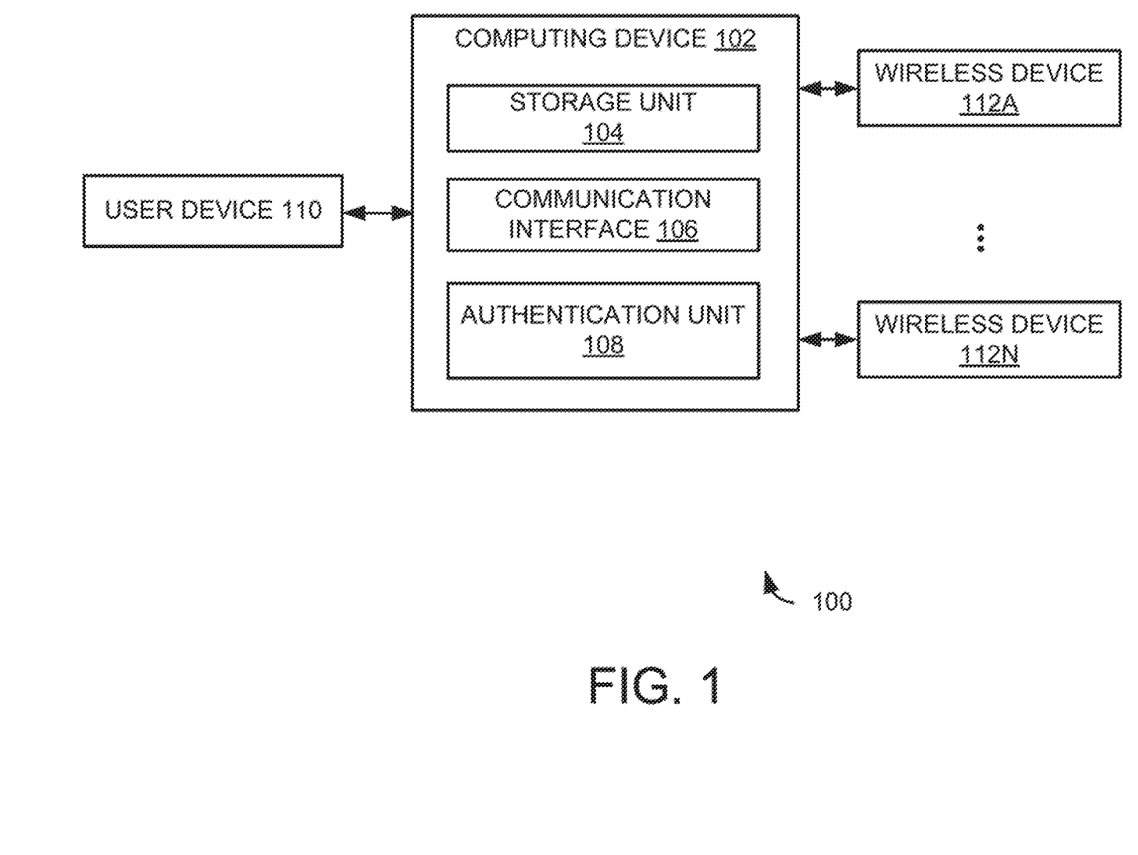
FIG. 1 is a block diagram illustrating an example computing device communicatively connected to wireless devices and a user device.

Turning now to figures, FIG. 1 is a block diagram illustrating a computing device 102 that is communicatively connected to a user device 110 and wireless devices 112A-112N. As shown in FIG. 1, computing device 102 may include a storage unit 104, a communication interface 106, and an authentication unit 108. For example, storage unit 104 may be an internal memory of computing device 102 or an external storage unit (e.g., a hard disk, a storage card, or a data storage medium) that can be accessible by computing device 102.

Figure 2:
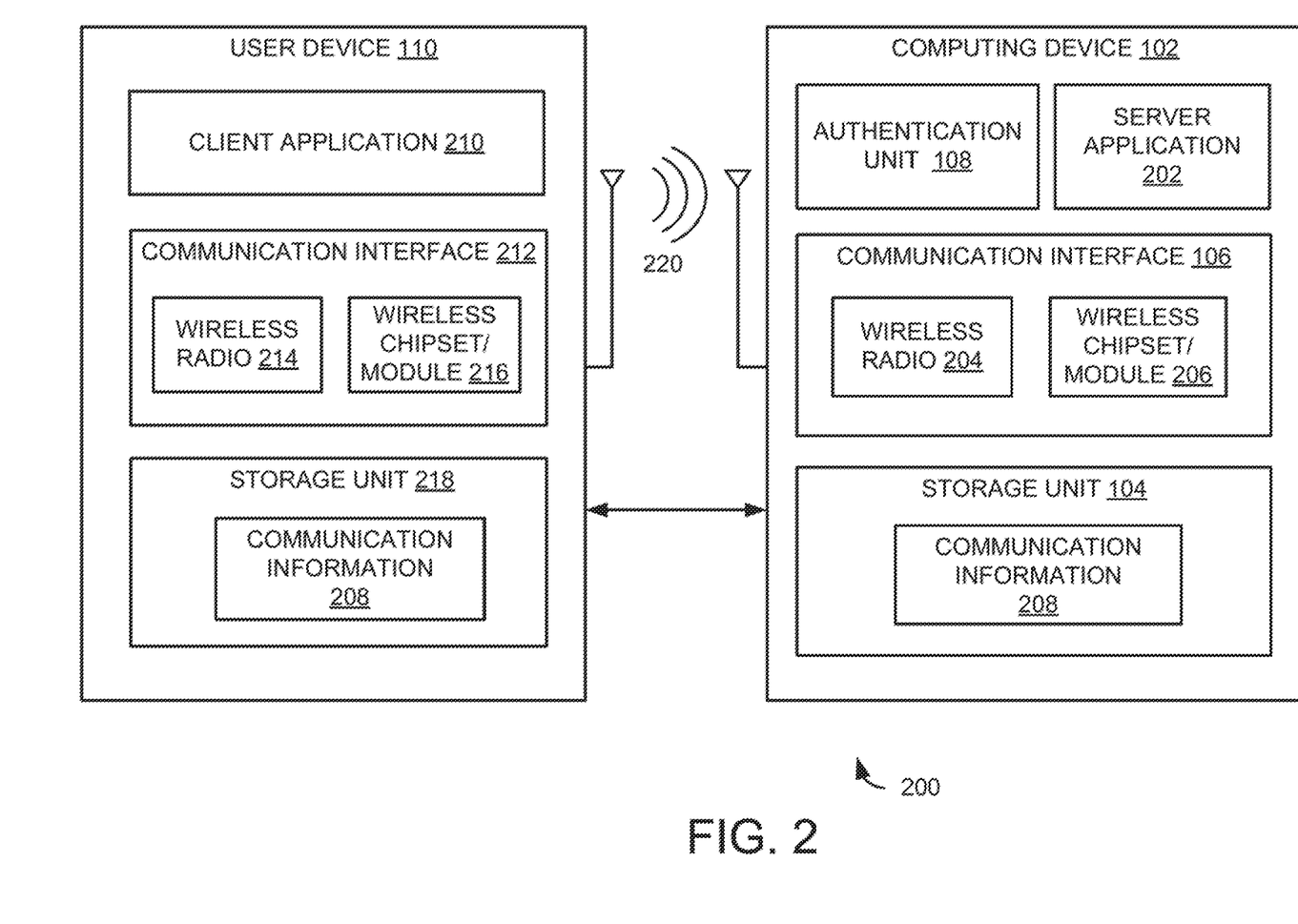
FIG. 2 is a block diagram illustrating additional components of the example computing device and user device of FIG. 1.

FIG. 2 is a block diagram 200 illustrating additional components of example computing device 102 and user device 110 of FIG. 1. As shown in FIG. 2, computing device 102 may include a server application 202 running therein and user device 110 may include a client application 210 running therein. For example, client application 210 and server application 202 may be instructions executable by respective processors to perform the functionalities described herein. Computing device 102 may be arranged spatially separate from user device 110 and wireless devices 112A-112N. In one example, computing device 102 may be positioned in a location. Example location may be a room (e.g., a meeting room, seminar room and/or friend's home) or any area falling within a broadcast range of wireless devices 112A-112N.

During operation, storage unit 104 may store communication information corresponding to wireless devices 112A-112N. As shown in FIG. 2, server application 202 residing in computing device 102 may obtain communication information 208 corresponding to wireless devices 112A-112N and store obtained communication information 208 in storage unit 104. Communication information 208 may include information used to establish communication between wireless devices 112A-112N and user device 110. For example, communication information 208 may include connection and pairing information such as device identifiers and passwords corresponding to wireless devices 112A-112N. In another example, communication information 208 may include information selected from the group consisting of an address of each of the wireless devices, a class of each of the wireless devices, a name of each of the wireless devices, a password of each of the wireless devices, service classes of services that each of the wireless devices support, and names of services that each of the wireless devices support.

During operator communication interface 106 may enable user device 110 to establish connection with computing device 102 via a short-range wireless communication of computing device 102, for instance, when the user enters the location or when the user is within the range of the short-range wireless communication of computing device 102. For example, short-range wireless communication may include a Bluetooth, Wi-Fi hotspot, near field communication (NFC), or quick response (QR) code scan. As shown in FIG. 2, communication interface 106 of computing device 102 and communication interface 212 of user device 110 may be connected via short-range wireless communication 220. For example, communication interface 106 may include a wireless radio 204, a wireless chipset/module 206, and the like to transmit and receive wireless signals. Further, communication interface 212 may include a wireless radio 214, a wireless chipset/module 216, and the like to transmit and receive wireless signals.

Further, communication interface 106 may receive a request to establish communication with wireless devices 112A-112N from user device 110 via short-range wireless communication 220. In one example, a request may be initiated by client application 210 residing in user device 110 upon establishing communication with computing device 102.

During operation, authentication unit 108 may authenticate access credentials associated with user device 110 to access wireless devices 112A-112N. Furthermore, authentication unit 108 may enable storage unit 104 to transmit the communication information associated with wireless devices 112A-112N to user device 110 upon successful authentication. The communication information 208 may be set up on user device 110 to establish communication with wireless devices 112A-112N.

In one example, authentication unit 108 may determine whether user device 110 has access rights to access wireless devices 112A-112N. When user device 110 has the access rights to access wireless devices 112A-112N, authentication unit 108 may enable server application 202 to retrieve and transmit communication information 208 associated with wireless devices 112A-112N to user device 110. This is explained in detail in FIG. 3.

Further, when user device 110 does not have access rights to access wireless devices 112A-112N, authentication unit 108 may send a notification to user device 110. The notification may be a pop-up message indicating that user device 110 does not have access rights to access wireless devices 112A-112N. In one example, access rights may be assigned to user device to get full/limited access to a listing of wireless devices 112A-112N. In one example, the access rights of user device 110 to each of wireless device 112A-112N may be defined/assigned by an administrator.

In one example, upon transmission of the communication information associated with wireless devices 112A-112N, as shown in FIG. 2, client application 210 may receive and store communication information 208 (e.g., device identifiers and passwords corresponding to wireless devices 112A-112N) in a storage unit 218 of user device 110. Further, client application 210 may automatically configure communication information 208 on user device 110 and then automatically establish communication with wireless devices 112A-112N. In another example, user device 110 may establish communication with wireless devices 112A-112N upon validation from the user. User device 110 and wireless devices 112A-112N may be in the same location (e.g., the meeting room, seminar room and/or friend's home) when communication between user device 110 and wireless devices 112A-112N takes place.

Figure 3:
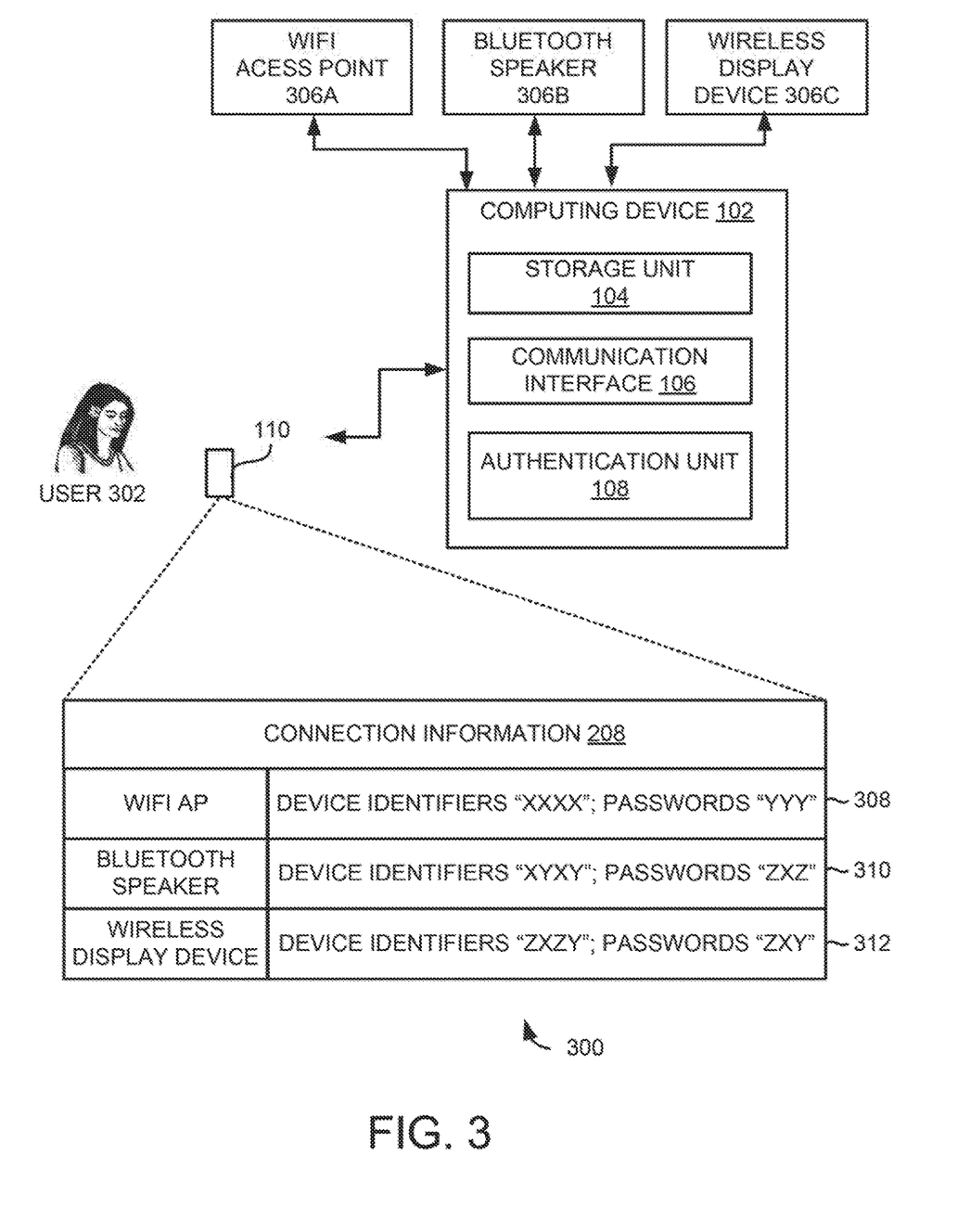
FIG. 3 is an example schematic depicting communication information associated with the wireless devices provided to user device using the computing device of FIGS. 1 and 2.

FIG. 3 is an example schematic 300 depicting communication information (e.g., 308, 310, and 312) associated with the wireless device (e.g., 306A, 306B, and 306C) provided to user device 110 using computing device 102 of FIGS. 1 and 2. For example, as shown in FIG. 3, consider a user 302 approaches towards computing device 102 for accessing wireless devices 306A-306C that are located in a seminar room. In this case, when user device 110 (e.g., mobile phone) of user 302 is in reach of computing device 102 (e.g., located inside the seminar room), then the following may be performed by computing device 102:

i. establish communication with user device 110 via a short-range wireless communication;
ii. receive a request from user device 110 to access wireless devices 306A-306C;
iii. authenticate access credentials (e.g., user identifier (ID)) associated with user device 110 to access wireless devices 306A-306C;
iv. determine the access rights of user device 110 to access wireless devices 306A-306C; and
v. enable storage unit 104 to transmit communication information 308-312 associated with wireless devices 306A-306C to user device 110 when user device 110 has the access rights.

The following may be performed by client application 210 residing in user device 110:

vi. receive and store communication information 12 associated with wireless devices 306A-306C in user device 110;
vii. automatically configure communication information 308-312 on user device 110; and
viii. enable user device 110 to establish communication with wireless devices 306A-306C.

Further, for above example, consider user device 110 has limited access rights (i.e., user device 110 has access rights for wireless devices 306B and 306C). In this case, authentication unit 108 may identify a set of wireless devices 306B and 306C having access to user device 110 based on the access rights. Further, authentication unit 108 may enable storage unit 104 to share communication information 310 and 312 associated with the identified wireless devices 306B and 306C to user device 110. Using the shared communication information 310 and 312, user device 304 may establish communication with the identified wireless devices 306B and 306C.

In another example, consider wireless devices 306A, 306B, and 306C may be located in a common room. For example, wireless device 306A may be a Wi-Fi access point, wireless device 306B may be an audio speaker (e.g., Bluetooth speaker), and wireless device 306C may be a wireless display device. Further, Wi-Fi access point 306A may be located on a ceiling wall, audio speakers 306B may be located in room corners, wireless display device 306C may be mounted on a wall in the room, and computing device 102 including storage unit 104 may be located on a table in the room. Upon entering the room, the user can send a request to obtain device identifiers and passwords of wireless devices 306A, 306B, and 306C to computing device 102 via a short-range wireless communication (e.g., Bluetooth). Computing device 102 may verify access rights of user device 110 to access the wireless devices 306A, 306B, and 306C and share the device identifiers and passwords of wireless devices 306A, 306B, and 306C upon successful verification of the access rights.

In one example, the components of computing device 102 and user device 110 may be implemented in hardware, machine-readable instructions or a combination thereof. In one example, authentication unit 108 and server application 202 of computing device 102, and client application 210 of user device 110 may be implemented as engines or modules comprising any combination of hardware and programming to implement the functionalities described herein. Even though FIG. 1 describes about computing device 102, the functionality of the components of device 102 may be implemented in other electronic devices such as personal computers (PCs), server computers, tablet computers, mobile devices and the like.

User device 110 and computing device 102 may include computer-readable storage medium comprising (e.g., encoded, with) instructions executable by a processor to implement functionalities described herein in relation to FIGS. 1-3. In some examples, the functionalities described herein, in relation to instructions to implement functions of components of user device 110 and computing device 102 and any additional instructions described herein in relation to the storage medium, may be implemented as engines or modules comprising any combination of hardware and programming to implement the functionalities of the modules or engines described herein. The functions of components of user device 110 and computing device 102 may also be implemented by respective processors. In examples described herein, the processor may include, for example, one processor or multiple processors included in a single device or distributed across multiple devices.

Figure 4:
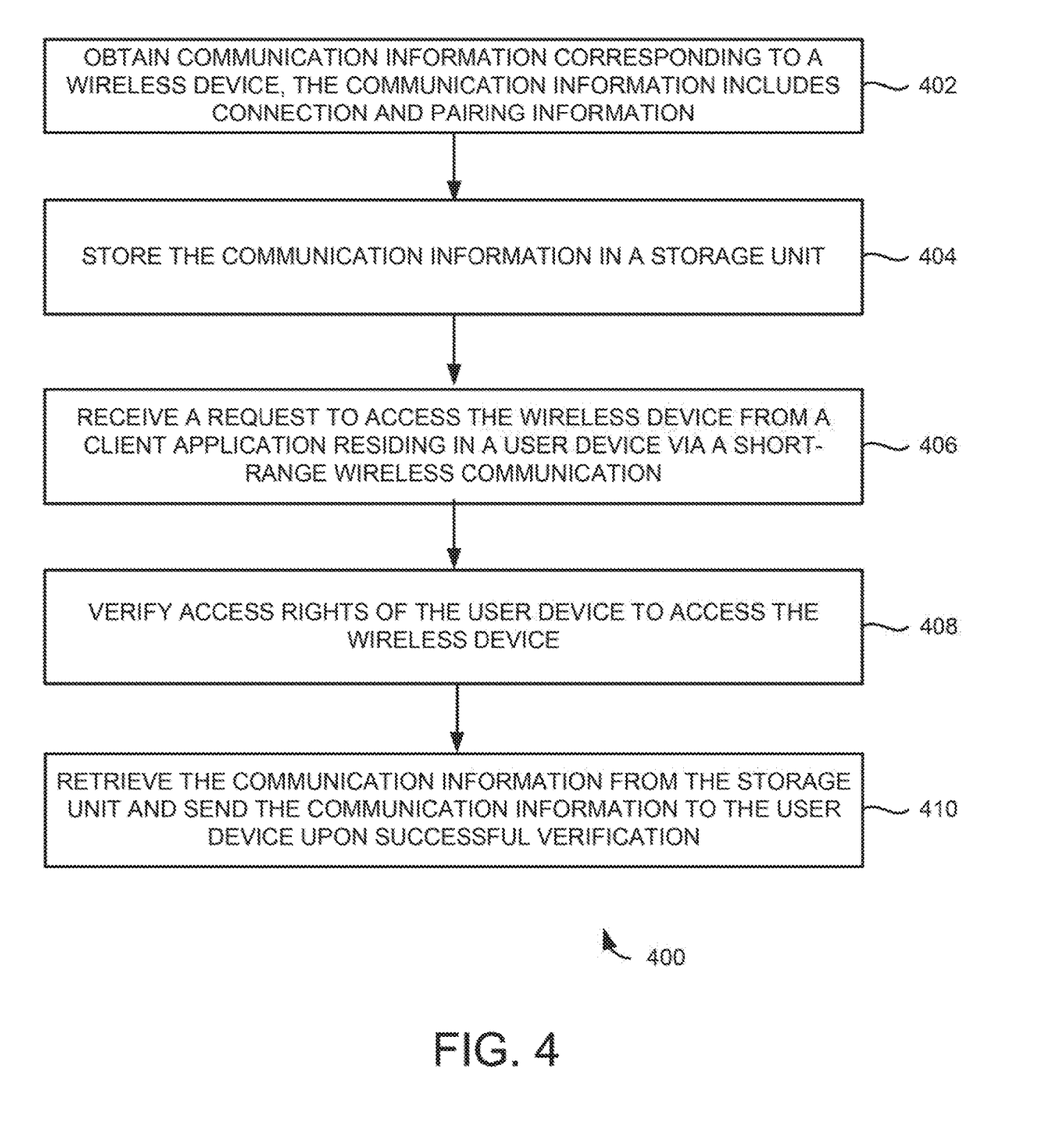
FIG. 4 depicts an example flow chart for providing communication information associated with wireless devices to a user device based on verification of access rights of the user device.

FIG. 4 depicts an example flow chart 400 for providing communication information associated with wireless devices to a user device based on verification of access rights of the user device. It should be understood that the process depicted in FIG. 4 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate software, or use a combination of hardware and software to perform the illustrated processes.

At 402, communication information corresponding to wireless device may be obtained. The communication information may include connection and pairing information associated with the wireless device. In one example, the communication information may include an address of the wireless device, a class of the wireless device, a name of the wireless device, a password of the wireless device, service class of service that the wireless device supports, and a name of service that the wireless device supports. At 404, the communication information may be stored in a storage unit. In one example, the storage unit may be positioned in a location. Example location may be a room such as a meeting room, seminar room, and/or friend's home.

At 406, a request to access the wireless device may be received from a client application residing in a user device via a short-range wireless communication. Prior to receiving the request, the user device may be enabled to establish connection with a computing device via the short-range wireless communication of the computing device. In one example, the wireless device, the user device, and the storage unit may be spatially separated.

At 408, access rights of the user device to access the wireless device may be verified. At 410, the communication information may be retrieved from the storage unit upon successful verification of the user device. Further, the retrieved communication information may be sent to the user device. The client application may set up the user device to communicate with the wireless device using the communication information when the user device is within a range of the wireless device. In one example, the user device and the wireless device are in the same location (e.g., room) when communication between the user device and the wireless device takes place. In one example, a notification may be sent to the user device when the verification of the access rights is failed.

Figure 5:
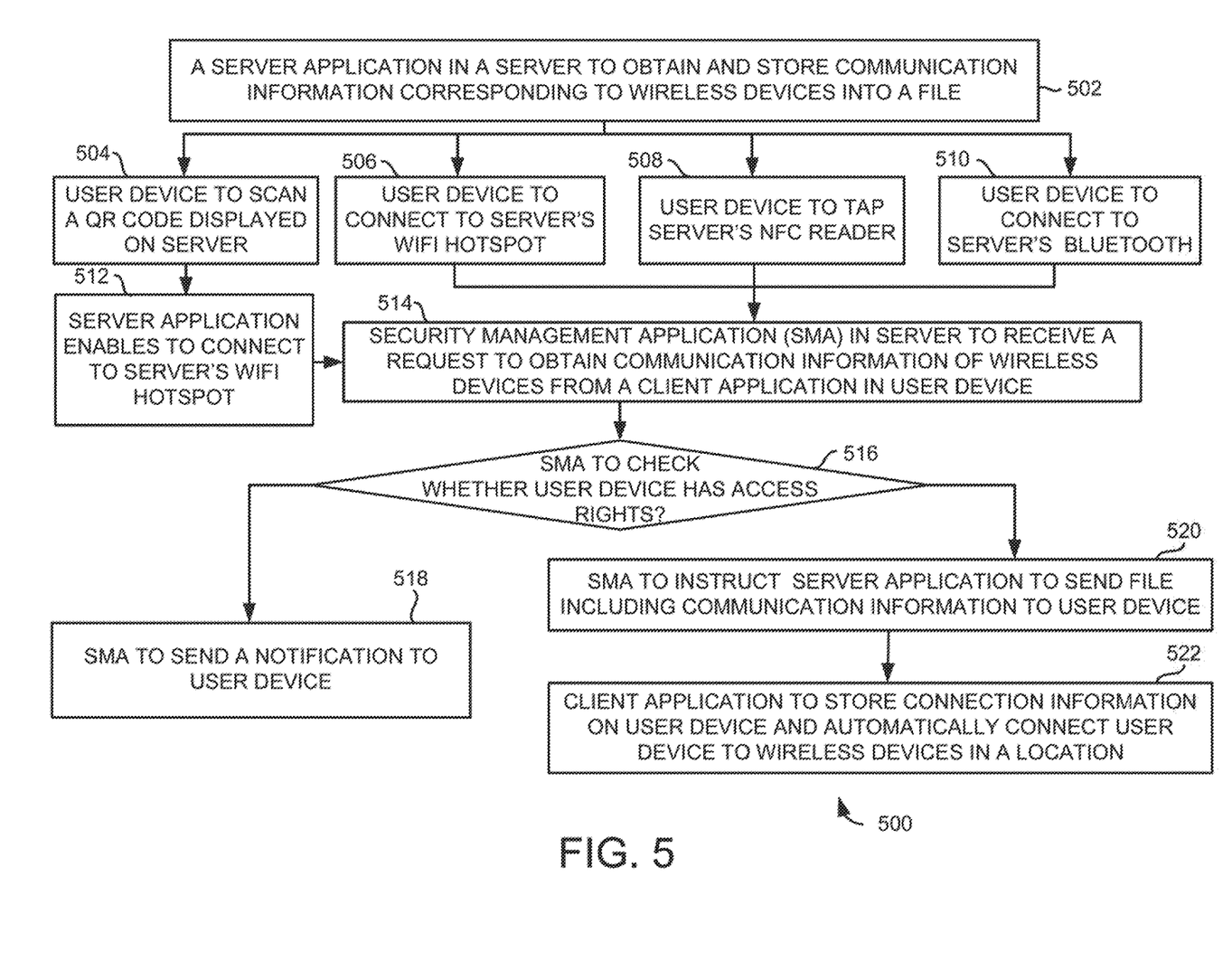
FIG. 5 depicts another example flow chart for providing communication information associated with wireless devices to a user device.

FIG. 5 depicts another example flow chart 500 for providing communication information associated with wireless devices to a user device. At 502, communication information corresponding to wireless devices may be obtained and stored into a file by a server application in a server. The communication information, may include connection and pairing information associated with the wireless devices. Using one of processes at 504-510, a connection may be established between with the user device and server via a short-range wireless communication.

At 504, user device may scan the QR code displayed on a user interface of the server. Upon scanning the QR code by the user device, the user device may be enabled to automatically connect to Wi-Fi hotspot of the server by the server application, at 512. At 506, user device may be connected directly to the Wi-Fi hotspot of the server. At 508, user device 110 may be peer-to-peer connected to the NFC reader of the server by taping the NFC reader. At 510, user device may be paired/connected to Bluetooth of the server.

At 514, a request to obtain communication information of the wireless devices may be received by a security management application (i.e., authentication unit 108 as shown in FIGS. 1-3) from a client application residing in the user device. At 516, a check may be made to determine whether the user device has access rights to access the wireless devices by the security management application. At 518, a notification may be sent to the user device by the security management application when the user device does not have access rights. At 520, server application may be allowed/instructed to send the file including the communication information to the user device by the security management application, when the user device has access rights.

At 522, the connection information may be stored on the user device and the user device may be automatically configured using the connection information to connect with the wireless devices by the client application. The user may access/use the wireless devices in the location upon establishing the connection.

Figure 6:
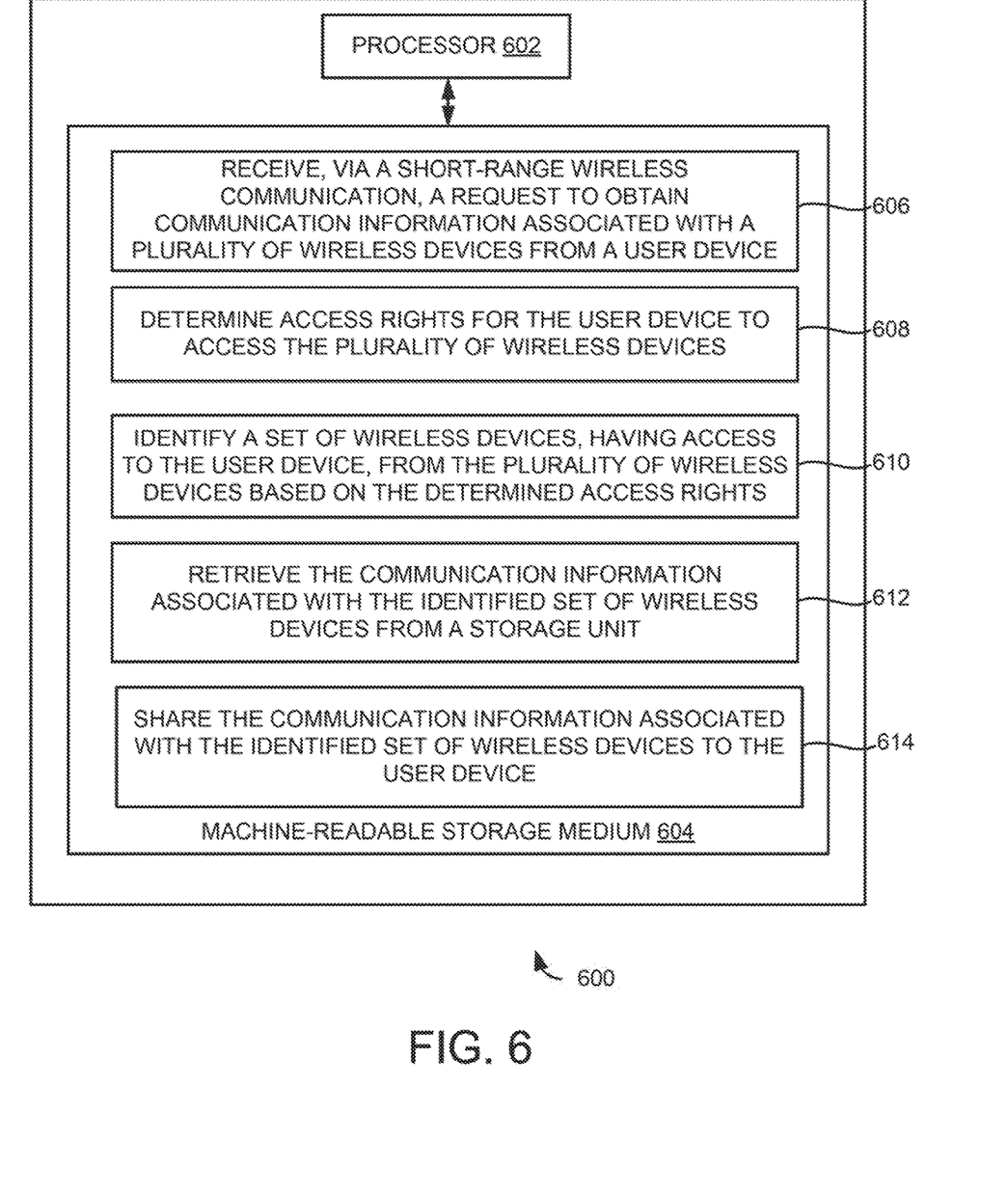
FIG. 6 depicts a block diagram of a computing device to share communication information associated with a set of wireless devices to a user device based on access rights of the user device.

FIG. 6 depicts a block diagram of a computing device 600 to share communication information associated with identified wireless devices to user device. Computing device 600 may include a processor 602 and a machine-readable storage medium 604 communicatively coupled through a system bus. Processor 602 may be any type of central processing unit (CPU), microprocessor, or processing logic that interprets and executes machine-readable instructions stored in machine-readable storage medium 604. Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to computing device 600.

Machine-readable storage medium 604 may store instructions 606-614. In an example, instructions 606-614 may be executed by processor 602 to share communication information associated with identified wireless devices to user device. The communication information may include connection and pairing information. Instructions 606 may be executed by processor 602 to receive, via a short-range wireless communication, a request to obtain communication information associated with a plurality of wireless devices from a user device. Instructions 608 may be executed by processor 602 to determine access rights for the user device to access the plurality of wireless devices.

Instructions 610 may be executed by processor 602 to identify a set of wireless devices, having access to the user device, from the plurality of wireless devices based on the determined access rights. Instructions 612 may be executed, by processor 602 to retrieve the communication information associated with the identified set of wireless devices from a storage unit. The storage unit may be arranged spatially separate from the user device and the plurality of wireless devices. In one example, the storage unit may be positioned in a location (e.g., a room).

Instructions 614 may be executed by processor 602 to share the communication information associated with the identified set of wireless devices to the user device. In one example, the user device may be automatically connected with the identified wireless devices using the communication information. In one example, the user device and the identified wireless devices may be in the same location (i.e., room) when communication between the user device and the identified wireless devices takes place.

It may be noted that the above-described examples of the present solution is for the purpose of illustration only.

Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A computing device, comprising:
a memory to store communication information corresponding to a plurality of wireless devices, wherein the communication information includes information to establish a communication between each of the plurality of wireless devices and a user device, wherein the plurality of wireless devices includes a WI-FI-enabled device and a BLUETOOTH-enabled device, and wherein the communication information corresponding to the plurality of wireless devices comprises a first password of the WI-FI-enabled device, and a second password for the BLUETOOTH-enabled device;
a communication interface to receive, from the user device via a short-range wireless communication, a request to establish the communication with the plurality of wireless devices; and
a processor to:
authenticate an access credential associated with the user device to access the plurality of wireless devices; and
transmit the communication information corresponding to the plurality of wireless devices to the user device in response to successful authentication of the access credential, the transmitted communication information comprising the first password of the WI-FI-enabled device used in connection establishment between the user device and the WI-FI-enabled device, and the second password for establishment of a connection between the user device and the BLUETOOTH-enabled device.

2. The computing device of claim 1, wherein the user device and the plurality of wireless devices are in a same location when the communication between the user device and the plurality of wireless devices takes place.

3. The computing device of claim 2, wherein the computing device is positioned in the same location, and wherein the same location is a room.

4. The computing device of claim 1, wherein the transmitted communication information further comprises a different device identifier corresponding to each of the plurality of wireless devices.

5. The computing device of claim 1, wherein the processor is to:
   determine whether the user device has access rights to access each of the plurality of wireless devices;
   transmit the communication information associated with each of the plurality of wireless devices to the user device when the user device has the access rights; and
   send a notification to the user device when the user device does not have access rights to access the plurality of wireless devices.

6. The computing device of claim 1, wherein prior to receiving the request, the communication interface is to enable the user device to establish a connection with the computing device via the short-range wireless communication.

7. The computing device of claim 1, wherein the WI-FI-enabled device is a WI-FI access point, and the first password in the transmitted communication information is for establishment of a connection between the user device and the WI-FI access point.

8. The computing device of claim 1, wherein the short-range wireless communication comprises a BLUETOOTH communication between the communication interface and the user device.

9. The computing device of claim 1, wherein the short-range wireless communication comprises a WI-FI communication between the communication interface and the user device.

10. The computing device of claim 1, wherein the short-range wireless communication comprises a Near-Field Communication between the communication interface and the user device.

11. A method comprising:
    obtaining communication information corresponding to a plurality of wireless devices, wherein the communication information includes connection and pairing information to establish a communication between each of the plurality of wireless devices and a user device, wherein the plurality of wireless devices includes a WI-FI-enabled device and a BLUETOOTH-enabled device, and wherein the communication information corresponding to the plurality of wireless devices comprises a first password of the WI-FI-enabled device, and a second password for the BLUETOOTH-enabled device;
    storing the communication information in a memory of a computing device;
    receiving, by the computing device via a short-range wireless communication from the user device, a request to access the plurality of wireless devices, wherein the plurality of wireless devices, the user device, and the computing device are spatially separated;
    verifying, by the computing device, access rights of the user device to access each of the plurality of wireless devices; and
    in response to successfully verifying the access rights, retrieving the communication information from the memory and transmitting, by the computing device, the communication information to the user device, the transmitted communication information comprising the first password of the WI-FI-enabled device used in connection establishment between the user device and the WI-FI-enabled device, and the second password for establishment of a connection between the user device and the BLUETOOTH-enabled device.

12. The method of claim 11, wherein the transmitted communication information comprises first information of a first wireless device of the plurality of wireless devices, the first information selected from the group consisting of: an address of the first wireless device, a class of the first wireless device, a name of the first wireless device, a service class of a service that the first wireless device supports, and a name of the service that the first wireless device supports.

13. The method of claim 11, wherein the user device and the plurality of wireless devices are in a same location when the communication between the user device and the plurality of wireless devices takes place.

14. The method of claim 11, further comprising sending a notification to the user device in response to a failure in verifying the access rights.

15. A non-transitory computer-readable storage medium comprising instructions that when executed cause a user device to:
    send, to a server device via a short-range wireless communication, a request to obtain communication information associated with a plurality of wireless devices, wherein the plurality of wireless devices includes a WI-FI-enabled device and a BLUETOOTH-enabled device;
    receive, from the server device in response to the request, the communication information associated with the plurality of wireless devices, the received communication information comprising a first password for the WI-FI-enabled device, and a second password for the BLUETOOTH-enabled device; and
    automatically connect with the plurality of wireless devices using the received communication information, wherein an automatic connection of the user device with the WI-FI-enabled device uses the first password in the received communication information, and wherein an automatic connection of the user device with the BLUETOOTH-enabled device uses the second password in the received communication information.

16. The non-transitory computer-readable storage medium of claim 15, wherein the WI-FI-enabled device is a WI-FI access point, and wherein the automatic connection of the user device is with the WI-FI access point that uses the first password in the received communication information.

* * * * *